United States Patent [19]

Levine

[11] Patent Number: 5,591,033
[45] Date of Patent: Jan. 7, 1997

[54] APPARATUS FOR EFFICIENT READING

[76] Inventor: Shriley S. Levine, 9B Weavers' Hill, Greenwich, Conn. 06831-4245

[21] Appl. No.: 391,771

[22] Filed: Feb. 21, 1995

[51] Int. Cl.$^6$ ................................................. G09B 17/00
[52] U.S. Cl. ............................................... 434/178; 401/6
[58] Field of Search .................................... 434/178, 183,
434/433, 365, 166; 401/6, 7; 132/76.4;
15/425, 427, 435, 443, 444; 81/9.2; 30/167.1,
167, 168, 169; 433/148

[56] References Cited

U.S. PATENT DOCUMENTS

| 2,459,993 | 1/1949 | Crain | 401/6 |
| 5,088,509 | 2/1992 | Savage, III | 132/76.4 X |
| 5,336,201 | 8/1994 | Levine | 434/178 |

FOREIGN PATENT DOCUMENTS

| 2220352 | 10/1974 | France | 30/167 |
| 2431351 | 2/1980 | France | 30/167 |

Primary Examiner—Gene Mancene
Assistant Examiner—Jeffrey A. Smith
Attorney, Agent, or Firm—Seymour Levine

[57] ABSTRACT

A reading guide includes first and second reading directors oppositely positioned at terminating ends of the reading guide. A separation section having a predetermined separation length, on the longitudinal axis of the reading guide, separates the reading directors. Both directors have beveled end edges, the first director having an end edge width which is less than the end edge width of the second director. The beveled end edge of the first director is formed by a double taper, the angles of the two tapers with respect to the longitudinal axis being unequal. Similarly, the beveled end edge of the second director is formed by a double taper, the angles of these two tapers with respect to the longitudinal axis, however, are equal. In the separation region the reading guide has curved sides, which may be sections of a circular, ellipse, or any other curve, which extend the length of the separation region. Between these curved sides are first and second planar surfaces, which also extend the length of the separation region, one of these planar surfaces contains two groves into which the thumb or a finger may be selectively positioned when the reading guide is held in position for reading.

12 Claims, 1 Drawing Sheet

APPARATUS FOR EFFICIENT READING

BACKGROUND OF THE INVENTION

I have observed that the children who experience the most success in school are those who are "in love" with their books and other literature. Good students actually embrace their material, while pouring over it with rapt attention. They lean forward, touching and pointing to the words on the page with their fingers, pens, or pencils. At the same time, they are sub-vocalizing the words that they are reading. They consume with a passion, while they are literally "eating up" the printed matter. In contrast, the "failing student" uses body language that says to his books, "I want nothing to do with you! Don't come near me and don't touch me!" He sits at arms distance from his books and refuses to touch them, even while trying to read. He is detached, unfocused, difuse, and in a state of fight and flight.

Is the failing student learning disabled? Is he suffering from attention deficit deficiency? Is this underachiever work inhibited? Is he all of the above?

When dealing with a disabled reader, one cannot be absolutely sure of the etiology of the difficulty, since one is never really sure of the underlying causes of the deficiencies.

As early as 1925 attempts were made to identify the syndrome of developmental reading disability in disabled readers. This syndrome was separated from mental effect and brain damage. Much evidence was found in young students to show that poor visual memory for recognizing the printed word resulted in poor reproduction for recalling the word for writing and thus impaired reading and spelling. Poor auditory memory for words would result in the interference with their reproduction in speech and writing. Taken together, they resulted in poor speech patterns, meager and confused vocabulary, ungrammatical writing, and poor spelling. To further weaken the circuit, poor handwriting and poor spelling would then result in poor visual or auditory reinforcement of word patterns.

As a frame of reference, a neurological concept was developed, which described three levels of cortical elaboration by which the sense organs received sensations. It was noted that anatomically different brain areas gave rise to: level 1.) awareness of an external stimulus; level 2.) recognition of its concrete meaning; and level 3.) association of language meaning to the stimulus. It was at this third level—the word level—in the visual or auditory areas of the brain, that specific delays occurred. This language disturbance was found in cases of developmentally word-blind or word-deaf children. In word-blind children, tests showed that in the visual area the youngsters with specific reading difficulties could see the print clearly, recognize that they were seeing letters and words, yet could not read them, i.e. identify them as meaningful language symbols. Similarly, in word-deaf youngsters there was adequate hearing, they could identify sound correctly, but had difficulty in associating concepts with spoken words.

But the prognosis was good. It was found that, in a direct attack upon the child's educational problem, all sorts of behavioral and emotional disturbances, which had been the result of academic failure, generally subsided or disappeared.

A method for teaching reading which is based on the above findings and developments is disclosed in U.S. Pat. No. 5,338,201. This method utilizes a reading guide, an early version of which (disclosed in U.S. Patent application Ser. No. 08/237,386) has a letter director at one end which the student positions at the top of the first letter of each word to be read. The material to be read is placed, by the student, directly in front of the student. The student is then instructed to grasp the reading guided and position both arms about the reading material. Thus positioned and ready with the reading guide, the student is instructed to place the director above the first letter of the reading material. As the director is glided over each first letter in a word, the student is instructed to sub-vocalize the words and instructed to read only the first sentence and stop. At this juncture the student is requested to determine the most important word in the sentence, to state what the student knows about the material to be read, and compare what is already known to the information derived from reading the first sentence. The student is then instructed to continue reading and to stop periodically to question what was previously known and what new information was derived from the material.

A reading guide, which may be used with the method described in the above mentioned U.S. Patent, is disclosed herein, the aspects of which become clearly evident from the following detailed description with reference to the accompanying drawings.

SUMMARY OF THE INVENTION

A preferred embodiment of a reading guide in accordance with the present invention includes first and second reading directors terminating the reading guide and oppositely positioned, with a predetermined separation length, on the longitudinal axis of the reading guide. The first director has an end edge width which is less than the end edge width of the second director. Both directors have beveled end edges. The beveled end edge of the first director is formed by a double taper, the angles of the two tapers with respect to the longitudinal axis being unequal. Similarly, the beveled end edge of the second director is formed by a double taper, the angles of these two tapers with respect to the longitudinal axis, however, are equal. In the separation region the reading guide has curved sides, which may be sections of a circular, ellipse, or any other curve, which extend the length of the separation region. Between these curved sides are first and second planar surfaces, which also extend the length of the separation region, one of these planar surfaces contains two groves into which the thumb or a finger may be selectively positioned when the reading guide is held in position for reading.

In other preferred embodiments of the invention, the tapers creating the beveled end edge of the first director may be equal, while the tapers forming the beveled end edge of the second director may be unequal. All combinations of the first and second directors formed by the various taper angles may be employed.

In still other embodiments, one of the directors may be removed and replaced by a pen, pencil, or other device with which reading text may be marked or highlighted for quick future visual retrieval.

DESCRIPTION OF THE PREFERRED EMBODIMENT

Figure 1:
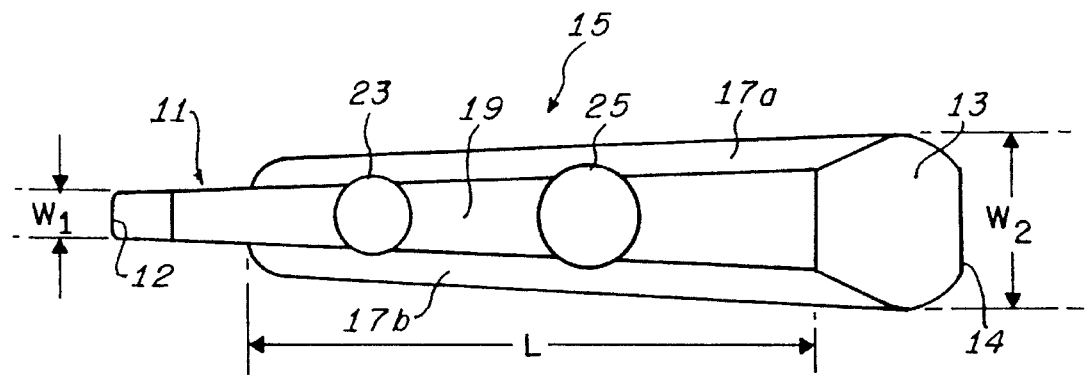
FIG. 1 is a top view of a preferred embodiment of the invention.
Figure 2:
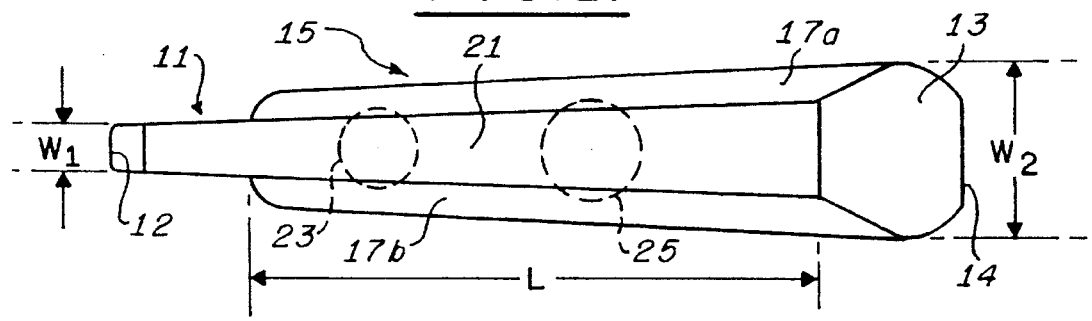
FIG. 2 is a bottom view of the preferred embodiment.
Figure 3:
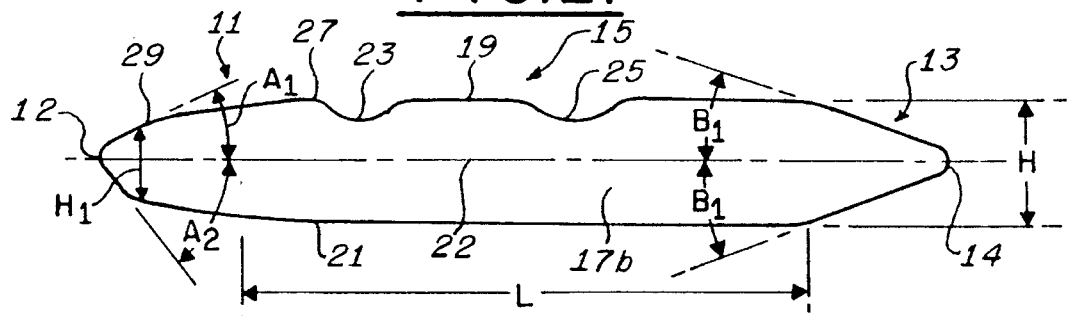
FIG. 3 is a side view of a preferred embodiment wherein the first reading director has a beveled edge formed by two unequal angles relative to the longitudinal axis, while the beveled edge of the second reading director is formed by equal angles relative to the longitudinal axis.

Refer now to FIGS. 1, 2, and 3, which are top bottom and side views, respectively, of a preferred embodiment of the invention and wherein all like elements bear the same reference numerals. A reading guide includes a first director 11 having an end edge 12, a second director 13 having an end edge 14, and a separation section 15. The end edge 12 of the first director 11 has a width $W_1$ and the end edge 14 of the second director has a width $W_2$ which is greater than the width $W_1$. The sides of the separation section 17a and 17b are curved, which may be sections of a circle, sections of an ellipse, or sections of any other type curve. Between the curved sides 17a and 17b are first 19 and second 21 planar surfaces, of length L, which extend the entire length of the separation section 15 and into the first director 11. Planar surfaces 19 and 21 are positioned with a distance H therebetween along an axis that is perpendicular to the longitudinal and lateral axes.

The lateral dimension of the separation section 15 may continuously taper down, in a linear manner, from a larger dimension at the second reading director 13 to a smaller dimension at the first reading director 11. This taper causes the planar surfaces 19 and 21 to taper from a larger dimension at the second reading director 13 to a smaller dimension at the first reading director 11.

First 23 and second 25 grooves are located in the first planar surface 19. The grooves 23 and 25 are selected by the reader for thumb placement when the reading guide is positioned for the reading process. In the embodiment shown in FIGS. 1, 2, and 3, the beveled end edge of the director 11 is formed with two tapers at different angles with respect to the longitudinal axis 22. The first taper is at an angle $A_1$ and the second taper is at an angle $A_2$, the angle $A_{,2}$ being greater than the angle $A_1$. The beveled edge 14 of the director 13 is formed by two tapers 13a and 13b, each of which are at an angle $B_1$ with respect to the longitudinal axis 22. It should be recognized that the beveled edge 12 of the first director 11 may be formed with tapers which form equal angles $A_1$ with the longitudinal axis 22 and the end edge 14 of the second director 13 may formed with tapers which form unequal angles $B_1$ and $B_2$, as shown in FIG. 4.

Figure 4:
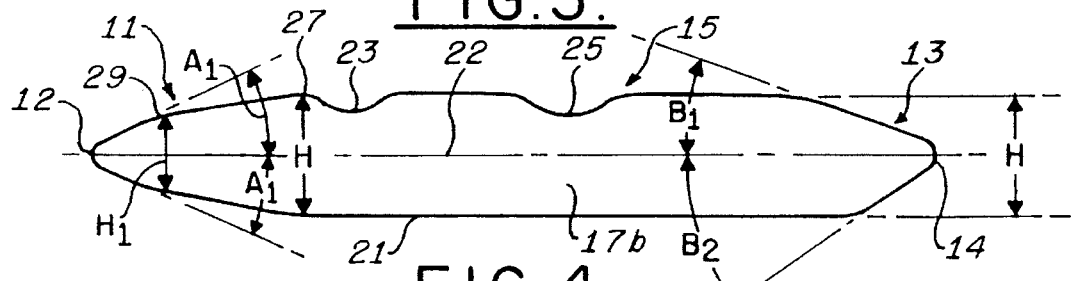
FIG. 4 is a side view of a preferred embodiment wherein the first reading director has a beveled edge formed by two equal angles relative to the longitudinal axis, while the beveled edge of the second reading director is formed by unequal angles relative to the longitudinal axis.

As shown in FIGS. 3 and 4, the height of the reading guide may linearly taper from the height H at the edge 27 of the groove 23 to lesser height $H_1$ at the edge 29 of the first director 11.

Prior to the reading process the reader selects reading director 11 or reading director 13. The selection of the reading director depends on the type of reading the reader intends. Reading director 11 is chosen if the reader is to read methodically and desires to position the director over a letter of each word. The reading director 11 is also chosen when it is necessary for the reader to position the director over the first letter of each word for support in mentally arranging the letters in the proper sequence to form the word. The two taper angles which form the end edge 12 of the first reading director 11 provide the reader with a choice of angles with which to orient the reading guide relative to the page of text. Positioning the reading director 11 with the taper side at angle $A_1$ on the page, orients the reading guide at an angle relative to the page that is greater than the orientation angle, relative to the page, of the reading guide that would provided if the taper side at angle $A_2$ were positioned on the page. The reader may select whichever of the two orientations is more suitable.

Figure 5:
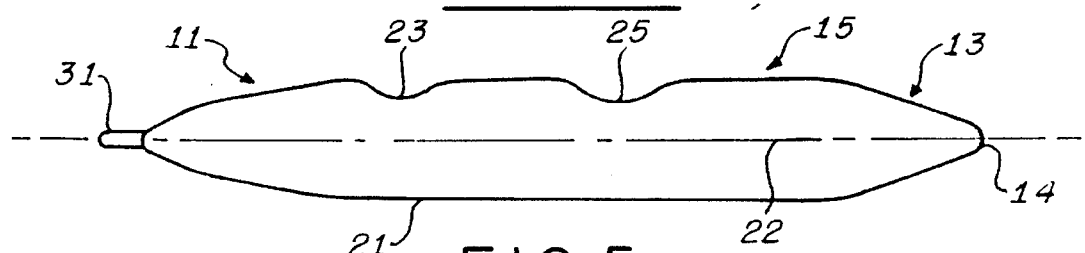
FIG. 5 is a side view of a preferred embodiment wherein the first reading director is replaced by a pen.

The reading director 13 is chosen when the reader intends to read rapidly or skim the test. The reading director 13 extends over many letters in a word and in many instances extends over the entire word. With the proper positioning of the reading director 13 the reader may read the text rapidly and understand the material read.

in many instances the reader may wish to scan or rapidly read the material and mark or highlight areas in the text of particular interest. Such a desire may also occur when methodical reading is planned. To accommodate such desires either the director 11 or the director 13 may be replaced with a highlighting marker, a pencil, or a pen. FIG. 5 indicates the replacement of the reading director 11 with a pen or pencil 31. When a region for marking is encountered the reading guide may be reversed to place the marker or pen on the page and mark the desired text.

While the invention has been described in its preferred embodiments, it should be understood that the words that have been used are words of description rather than limitation and that changes may be made within the purview of the appended claims without departing from the true scope and spirit of the invention.

I claim:

1. A reading guide comprising:

first and second directors oppositely terminating said reading guide on a longitudinal axis, said first director having an end with a predetermined width along a lateral axis, said second director having an end with a predetermined width along said lateral axis which is greater than said predetermined width of said first director end, said first reading director having a beveled end edge formed by first and second tapers having first and second angles relative to said longitudinal axis, respectively, said first angle being greater than said second angle;

a separation section, having a predetermined longitudinal length, positioned between said first and second directors, said separation section having curved sides, and first and second planar surfaces positioned between said first and second curved sides, and located at a preselected distance apart along an axis perpendicular to said longitudinal and lateral axes, said separation section being linearly tapered from a first lateral dimension at said first director to a second lateral dimension at said second director, said second lateral dimension being greater than said first lateral dimension.

2. The reading guide of claim 1 wherein said second director has a beveled end edge formed by third and fourth angles relative to said longitudinal axis, said third angle being equal to said fourth angle.

3. The reading guide of claim 1 wherein said second director has a beveled end edge formed by third and fourth angles relative to said longitudinal axis, said third angle being greater than said fourth angle.

4. The reading guide of claim 1 wherein first and second grooves are positioned at selected locations in said first planar surface.

5. The reading guide of claim 4 wherein said preselected distance apart of first and second planar surfaces is linearly decreased from a preselected longitudinal location of said reading guide to a preselected height in said first reading director by equal taper angles for said first and second planar surfaces, said taper angles being relative to said axis perpendicular to said longitudinal and said lateral axes.

6. A reading guide comprising:

means for highlighting text positioned on a first end of said reading guide;

reading director positioned on said reading guide at a second end of said reading guide opposite said first end, said first and second ends being on a longitudinal axis of said reading guide;

said reading director having a beveled end edge formed by first and second angles, said first angle being equal to said second angle;

a separation section, having a predetermined longitudinal length, positioned between said highlighting means and said reading director, said separation section having curved sides, and first and second planar surfaces positioned between said first and second curved sides, and located at a preselected distance apart along an axis perpendicular to said longitudinal and lateral axes;

said separation section being linearly tapered from a first lateral dimension at said marking means to a second lateral dimension at said reading director, said second lateral dimension being greater than said first lateral dimension, wherein said first and second angles are defined in a plane extending along said longitudinal axis and said axis perpendicular to said longitudinal axis and lateral axes.

7. The reading guide of claim 6 wherein said highlighting means is a pen.

8. A reading guide comprising:

first and second directors oppositely terminating said reading guide on a longitudinal axis, said first director having an end with a predetermined width along a lateral axis, said second director having an end with a predetermined width along said lateral axis which is greater than said predetermined width of said first director end, said first reading director having a beveled end edge formed by first and second tapers having first and second angles, respectively, said first angle being equal to said second angle;

a separation section, having a predetermined longitudinal length, positioned between said first and second directors, said separation section having curved sides, and first and second planar surfaces positioned between said first and second curved sides, and located at a preselected distance apart along an axis perpendicular to said longitudinal and lateral axes, said separation section being linearly tapered from a first lateral dimension at said first director to a second lateral dimension at said second director, said second lateral dimension being greater than said first lateral dimension, wherein said first and second angles are defined in a plane extending along said longitudinal axis and said axis perpendicular to said longitudinal axis and lateral axes, said first and second angles sharing a common vertex positioned along said beveled end edge.

9. The reading guide of claim 8 wherein said second director has a beveled end edge formed by third and fourth angles relative to said longitudinal axis, said third angle being greater than said fourth angle.

10. The reading guide of claim 8 wherein said second director has a beveled end edge formed by third and fourth angles relative to said longitudinal axis, said third angle being equal to said fourth angle.

11. The reading guide of claim 8 wherein first and second grooves are positioned at selected locations in said first planar surface.

12. The reading guide of claim 11 wherein said preselected distance apart of first and second planar surfaces is linearly decreased from a preselected longitudinal location of said reading guide to a preselected height in said first reading director by equal taper angles for said first and second planar surfaces, said taper angles being relative to said axis perpendicular to said longitudinal and said lateral axes.

* * * * *